US009028014B2

(12) United States Patent
Clary et al.

(10) Patent No.: US 9,028,014 B2
(45) Date of Patent: May 12, 2015

(54) SYSTEM AND METHOD FOR PROVIDING INDICATION OF BRAKING FOR ELECTRIC BRAKES

(75) Inventors: Thomas Clary, Tipp City, OH (US); William P. May, Tipp City, OH (US); Paul L. Summers, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 383 days.

(21) Appl. No.: 12/963,277

(22) Filed: Dec. 8, 2010

(65) Prior Publication Data

US 2012/0145490 A1 Jun. 14, 2012

(51) Int. Cl.
  *B60T 8/17* (2006.01)
  *B60T 8/88* (2006.01)
  *B60T 13/74* (2006.01)

(52) U.S. Cl.
  CPC ......... *B60T 8/1703* (2013.01); *B60T 2270/413* (2013.01); *B60T 8/885* (2013.01); *B60T 13/741* (2013.01); *B60T 2270/402* (2013.01)

(58) Field of Classification Search
  CPC ..... B60T 13/741; B60T 8/1703; B60T 8/885; B60T 2270/402; B60T 2270/413
  USPC ............ 303/20, 126, 199; 188/156, 158, 161; 244/110 A, 110 H
  See application file for complete search history.

(56) References Cited

U.S. PATENT DOCUMENTS

| | | | |
|---|---|---|---|
| 6,296,325 B1 | 10/2001 | Corio et al. | |
| 6,908,162 B2 * | 6/2005 | Obayashi et al. | 303/152 |
| 7,268,515 B1 * | 9/2007 | Tsai et al. | 318/801 |
| 8,112,213 B2 * | 2/2012 | Cahill et al. | 701/70 |
| 2001/0045771 A1 * | 11/2001 | Corio et al. | 303/20 |
| 2004/0201270 A1 | 10/2004 | Suzuki et al. | |
| 2006/0108864 A1 * | 5/2006 | Evans et al. | 303/126 |
| 2008/0258547 A1 * | 10/2008 | Ralea et al. | 303/122 |
| 2008/0258548 A1 * | 10/2008 | May et al. | 303/139 |
| 2009/0278401 A1 * | 11/2009 | Summers et al. | 303/20 |
| 2010/0070150 A1 * | 3/2010 | May | 701/71 |
| 2010/0274457 A1 * | 10/2010 | Cahill | 701/70 |
| 2010/0274458 A1 * | 10/2010 | Cahill et al. | 701/76 |
| 2010/0276988 A1 | 11/2010 | Cahill | |
| 2010/0292889 A1 * | 11/2010 | Cahill et al. | 701/31 |

FOREIGN PATENT DOCUMENTS

WO  2007120267  10/2007

OTHER PUBLICATIONS

EP; Extended Search Report dated Mar. 29, 2012 in Application No. 11250745.4.

* cited by examiner

*Primary Examiner* — Robert A Siconolfi
*Assistant Examiner* — Charles Poon
(74) *Attorney, Agent, or Firm* — Snell & Wilmer, L.L.P.

(57) ABSTRACT

A system for electrical braking of a vehicle comprises a power bus coupled to a first driver associated with a first electromechanical actuator (EMA). The power bus is also coupled to a second driver associated with a second EMA, and the first EMA and the second EMA are associated with a wheel of the vehicle. The power bus provides braking power to the first EMA via the first driver and to the second EMA via the second driver. A normal braking command interface provides a first braking signal to the first driver and a second braking signal to the second driver. An emergency/park brake interface bypasses the normal braking command interface and sends a first emergency/park braking signal to the first driver and a second emergency/park braking signal to the second driver. A sensor measures a current at a single location of the power bus that is proportional to a braking force exerted on the wheel.

11 Claims, 4 Drawing Sheets

SYSTEM AND METHOD FOR PROVIDING INDICATION OF BRAKING FOR ELECTRIC BRAKES

FIELD OF INVENTION

This disclosure generally relates to electrical braking, and more particularly, to systems and methods for providing an indication of an applied braking force for electric brakes.

BACKGROUND OF THE INVENTION

Aircraft and other vehicles typically utilize emergency and/or parking brake systems to activate the brakes during emergency situations where normal braking systems usually fail and during situations where the aircraft is parked. Such emergency and/or parking brake systems may be electrically or hydraulically operated.

An electrically operated braking system for a vehicle generally includes a brake control unit (BCU) that receives a control signal, for example, from a pedal and/or switch in the vehicle. The BCU utilizes the control signal to command an electromechanical actuator controller (EMAC) to power an actuator coupled to a wheel of the vehicle. The power provided by the EMAC to the actuator facilitates exerting a braking force on the wheel to cause the vehicle to slow down and/or come to a stop.

These electrically operated braking systems may include systems for providing emergency and/or parking brake functionality to the aircraft. Examples of such systems are disclosed in commonly-assigned U.S. patent application Ser. No. 12/429,303, entitled "Electric Brake Architecture With Dissimilar Emergency Braking Path" (filed Apr. 24, 2009) and U.S. patent application Ser. No. 12/433,050, entitled "Differential Emergency/Park Electric Brake System" (filed Apr. 30, 2009), the entire disclosures of which are incorporated herein by reference.

While these systems are beneficial, improvements are desired to further increase the safety and functionality of the electrical braking systems. For example, it is desirable to generate an indication that a braking force is being applied to the brakes during an emergency or parking situation, while reducing the circuitry and/or wiring utilized to make this determination.

SUMMARY OF THE INVENTION

Various embodiments relate to systems and methods for sensing current drawn and/or power consumed by an electromechanical actuator (EMA) in order to determine whether a braking force is being applied by the EMA. The current drawn is proportional to the braking force being applied by the EMA. Current drawn by a plurality of EMAs may be measured at a single location to reduce circuitry and wiring, as opposed to measuring the current drawn individually by each EMA. In an embodiment, the current may be sensed at the single location during an emergency/park braking operation to determine whether the desired braking is being applied. Further, in an embodiment, the current may be sensed at the single location to provide a system for cross-checking the behavior of a normal braking operation.

In an embodiment, a system for electrical braking of a vehicle comprises a power bus coupled to a first driver associated with a first electromechanical actuator (EMA). The power bus is also coupled to a second driver associated with a second EMA, and the first EMA and the second EMA are associated with a wheel of the vehicle. The power bus provides braking power to the first EMA via the first driver and to the second EMA via the second driver. The system further comprises a normal braking command interface for providing a first braking signal to the first driver and a second braking signal to the second driver.

Further, in an embodiment, the system comprises an emergency/park brake interface for sending a first emergency/park braking signal to the first driver and a second emergency/park braking signal to the second driver. The first emergency/park braking signal and the second emergency/park braking signal bypass the normal braking command interface. A sensor is coupled to the power bus for measuring a current at a single location of the power bus, and the current is proportional to a braking force exerted by the first EMA and the second EMA on the wheel. The current measured by the sensor may indicate to a vehicle operator that the first EMA and the second EMA are exerting the braking force on the wheel. Additionally, the current measured by the sensor may relate to at least one of a drawn current and a consumed power, and the current may indicate to a vehicle operator that the braking force complies with the first emergency/park braking signal and the second emergency/park braking signal.

In various embodiments, the normal braking command interface comprises a brake control unit (BCU), and the first braking signal and the second braking signal include a normal braking signal from a normal braking signal interface of the vehicle. The current measured by the sensor may indicate to a vehicle operator that the braking force complies with the normal braking signal.

According to an embodiment, the first driver is disposed in the first EMA and the second driver is disposed in the second EMA. Further, in an embodiment, the system may comprise an electromechanical actuator controller (EMAC), and the first driver and the second driver may be disposed in the EMAC. In such an embodiment, the EMAC is coupled to the BCU for receiving the first braking signal and the second braking signal from the BCU, and the EMAC comprises a processor coupled to the first driver and the second driver for instructing the first EMA and the second EMA to exert the braking force on the wheel. In various embodiments, the EMAC comprises a plurality of EMA drivers for providing a plurality of driving signals to a plurality of EMAs, and the sensor measures the current at the single location for estimating the braking force exerted by the plurality of EMAs. In an emergency/park braking operation, the first emergency/park braking signal and the second emergency/park braking signal bypass the processor in the EMAC.

In various embodiments, the system further comprises a power controller coupled to the power bus for providing power to the first driver and the second driver in response to at least one of the first braking signal, the second braking signal, the first emergency/park braking signal, or the second emergency/park braking signal. A second sensor may be disposed between the power controller and the first driver and the second driver, and the second sensor is for measuring, at a second single location, the current associated with at least one of the first braking signal, the second braking signal, the first emergency/park braking signal, or the second emergency/park braking signal.

Furthermore, in an embodiment, a system for electrical braking of a vehicle comprises a power bus coupled to a first driver associated with a first EMA. The power bus is also coupled to a second driver associated with a second EMA, and the first EMA and the second EMA are associated with a wheel of the vehicle. The power bus provides braking power to the first EMA via the first driver and to the second EMA via the second driver. A normal braking command interface provides a first braking signal to the first driver and a second braking signal to the second driver. An emergency/park brake interface sends a first emergency/park braking signal to the first driver and a second emergency/park braking signal to the second driver, and the first emergency/park braking signal and the second emergency/park braking signal bypass the normal braking command interface.

The system further comprises a power controller coupled to the power bus and the first driver and the second driver. A sensor is coupled between the power bus and the first driver and the second driver for measuring a current at a single location, wherein the current is proportional to a braking force exerted by the first EMA and the second EMA on the wheel.

Moreover, in accordance with various embodiments, a method for electrical braking of a vehicle comprises sending a first braking signal from a normal braking command interface to a first driver associated with a first electromechanical actuator (EMA). A second braking signal is sent from the normal braking command interface to a second driver associated with a second EMA, and the first EMA and the second EMA exert a braking force on a wheel of the vehicle.

A first emergency/park braking signal is sent from an emergency/park brake interface to the first driver, and the first emergency/park braking signal bypasses the normal braking command interface. A second emergency/park braking signal is sent from an emergency/park brake interface to the second driver, and the second emergency/park braking signal bypasses the normal braking command interface. Braking power is provided from a power bus, through a power controller and through the first driver and the second driver to the first EMA and the second EMA. Current is measured at a single location with a sensor coupled between a power source and the first driver and the second driver, and the current is proportional to the braking force exerted by the first EMA and the second EMA on the wheel.

In various embodiments, the method further comprises sending the first braking signal and the second braking signal from a brake control unit to a processor in an EMAC, and the normal braking command interface includes the BCU. A processor controls a plurality of braking forces exerted by a plurality of EMAs.

Further, in an embodiment, the method comprises cross-checking a desired braking force associated with the first braking signal and the second braking signal and the first EMA and the second EMA using the current measured at the single location. The method may further comprise feeding a signal corresponding to the current measured at the single location through the normal braking command interface to facilitate cross-checking the braking force exerted by the first EMA and the second EMA.

In various embodiments, measuring the current comprises measuring an amount of current drawn by the first EMA and the second EMA at the single location, and the amount of current drawn is proportional to the braking force exerted by the first EMA and the second EMA on the wheel. Further, the method may comprise indicating to a vehicle operator that the first EMA and the second EMA are exerting the braking force on the wheel in accordance with at least one of the first braking signal, the second braking signal, the first emergency/park braking signal, or the second emergency/park braking signal.

BRIEF DESCRIPTION OF THE DRAWINGS

The systems and/or methods disclosed herein may be better understood with reference to the following drawing figures and description. Non-limiting and non-exhaustive descriptions are described with reference to the following drawing figures. The components in the figures are not necessarily to scale, emphasis instead being placed upon illustrating principles. In the figures, like referenced numerals may refer to like parts throughout the different figures unless otherwise specified.

DETAILED DESCRIPTION

The detailed description of various embodiments herein makes reference to the accompanying drawing figures, which show various embodiments and implementations thereof by way of illustration and its best mode, and not of limitation. While these embodiments are described in sufficient detail to enable those skilled in the art to practice the embodiments, it should be understood that other embodiments may be realized and that mechanical and other changes may be made without departing from the spirit and scope of the disclosure. Furthermore, any reference to singular includes plural embodiments, and any reference to more than one component may include a singular embodiment.

Also, any reference to attached, fixed, connected or the like may include permanent, removable, temporary, partial, full and/or any other possible attachment option. Additionally, though the various embodiments discussed herein may be carried out in the context of an aircraft, it should be understood that systems and methods disclosed herein may be incorporated into anything needing a brake or having a wheel, or into any vehicle such as, for example, an aircraft, a train, a bus, an automobile and the like.

The various embodiments of the electrical braking system and method comprise the features hereinafter described and particularly pointed out in the claims. The following description and the annexed drawings set forth in detail certain illustrative embodiments of the disclosure. These embodiments are indicative, however, of but a few of the various ways in which the principles disclosed herein may be employed. Other objects, advantages and novel features will become apparent from the following detailed description when considered in conjunction with the drawings.

Figure 1:
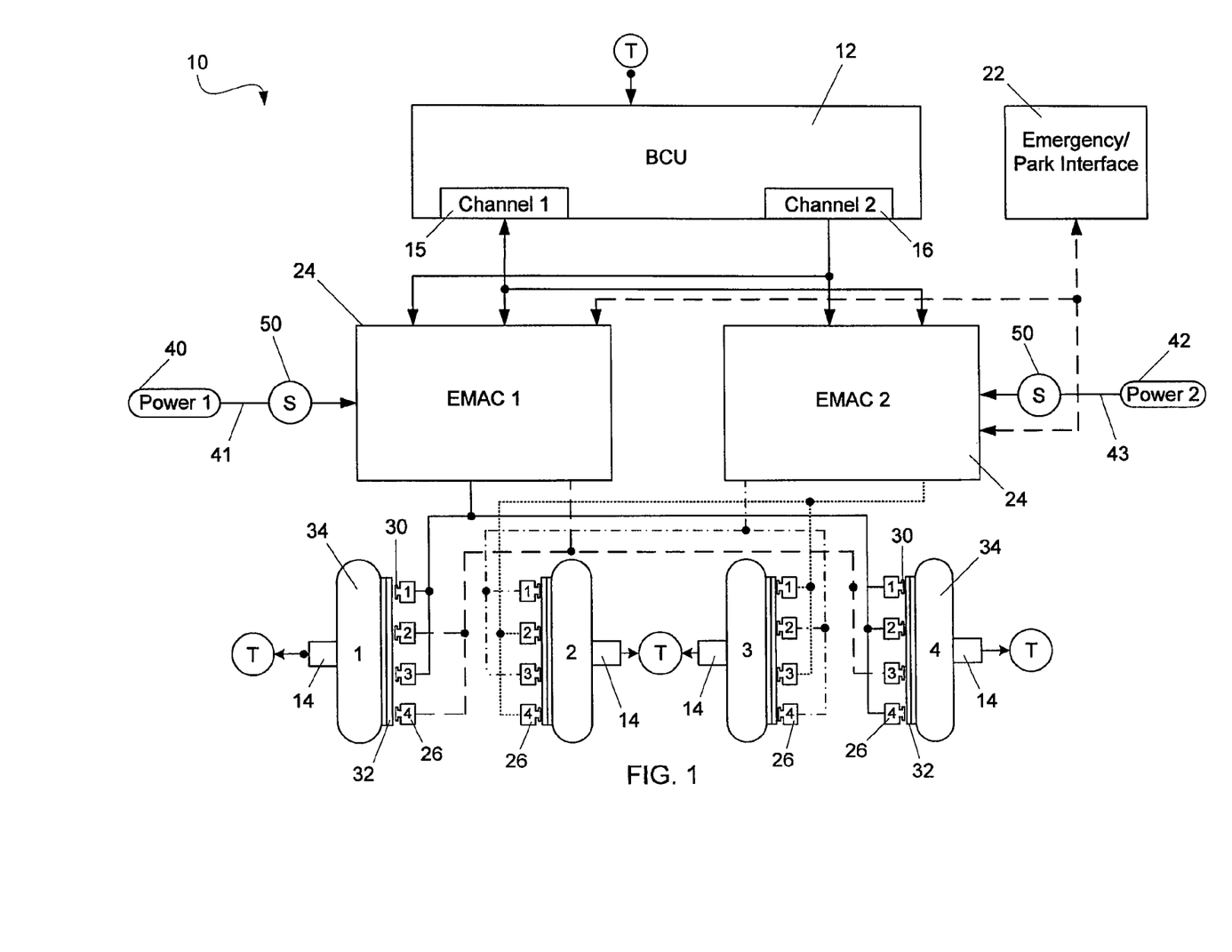
FIG. 1 illustrates a schematic representation of an electrical braking system according to an embodiment.

With reference to FIG. 1, and in accordance with various embodiments, an electrical braking system 10 comprises a normal braking command interface, such as a brake control unit (BCU) 12 that carries out braking operations of a vehicle such as an aircraft. The BCU 12 receives operator inputs, brake pedal inputs, autobrake inputs, anti-skid inputs, emergency brake inputs, parking brake inputs, and the like. Accordingly, "interface" as used herein and in the claims (e.g., "normal braking command interface," "normal braking signal interface" or "emergency/park interface" as described below) may refer to pedals, handles, levers, buttons, dials, switches, digital displays, touch screens, computers, processors, and the like. Further, the BCU 12 may receive inputs from other sensors, such as wheel speed sensors 14. Additionally, the BCU 12 may include a normal braking signal interface that allows a vehicle operator to provide a braking indication to the BCU 12.

These various inputs may be used to generate braking commands that the BCU 12 sends to electromechanical actuator controllers (EMACs) 24, and the BCU 12 is communicatively coupled to the EMACs 24 to facilitate sending these commands. In an embodiment, the BCU 12 is coupled to the EMACs 24 via a serial communication link, although data may also be exchanged via discrete and/or analog connections. The BCU 12 may comprise various channels 15, 16 to facilitate communicating with the EMACs 24. These channels 15, 16 may be used to provide redundant commands to the EMACs 24 to increase the safety of the braking system 10.

Further, in certain embodiments, the EMACs 24 may not be employed, and, instead, the BCU 12 may communicate with electromechanical actuators (EMAs) as discussed further below. Such a configuration may be referred to as a distributed case, and the drivers and other processing functionality utilized to effectuate braking may be carried out substantially at each of the EMAs on the wheels of the vehicle.

In various embodiments, an emergency/park brake interface 22 also sends braking commands to the EMACs 24 and/or to the EMAs without going through an EMAC 24. The emergency/park interface 22 may indicate that normal, emergency, and/or park braking is desired. For example, emergency/park brake interface 22 may carry out any braking operation that reduces and/or slows down the speed of a vehicle in response to an unexpected, exigent, and/or time-sensitive event. Further, emergency/park brake interface 22 may carry out any braking operation that facilitates maintaining the vehicle in a stopped condition or preventing the vehicle from moving. In various embodiments, the emergency and park braking setting may be the same or different settings. When the normal braking setting or signal is indicated, braking functionality is carried out by the EMACs in accordance with the command signals from the BCU 12. When emergency and/or park braking is indicated by the emergency/park interface 22, braking functionality is carried out by the EMACs 24 in accordance with the command signal from the emergency/park interface 22.

In a distributed case, where the EMACs 24 are not employed, during normal braking, braking functionality is carried out by the EMAs in accordance with the command signals from the BCU 12. When emergency and/or park braking is indicated by the emergency/park interface 22, braking functionality is similarly carried out by the EMAs 24, in accordance with the command signal from the emergency/park interface 22 that bypasses the BCU 12.

In an embodiment, the EMACs 24 are electrically coupled to one or more electromechanical actuators (EMAs) 26. The EMAs 26 exert a braking force on a brake disk stack 32 by driving a ram 30 into the brake disk stack 32. Driving the ram 30 into the brake disk stack 32 causes a rotation of a wheel 34 to slow down and/or stop. Each EMA 26 may exert a braking force on the brake disk stack 32 that is independent from or the same as the braking force exerted by one or more other EMAs 26. Based on a brake mode signal received by each EMAC 24, the EMAC determines whether to use the normal braking signal from the BCU 12 or the emergency/park brake signal from the emergency/park interface 22 to actuate the EMAs 26. In an embodiment where EMACs are not employed, the BCU 12 and the emergency/park interface 22 may communicate with the EMAs 26 to effectuate braking.

The EMACs 24 are powered from power sources 40, 42 via power busses 41, 43. For example, the power source 40 provides power to the EMAC 24 via the power bus 41. This power provided to the EMAC 24 at a single input to the EMAC 24 via power bus 41 may be utilized to provide power to one or more of the EMAs 26. In various embodiments, the power sources 40, 42 may include 270 VDC power sources. In embodiments where backup power is used, the power sources 40, 42 may include 28 VDC battery backup power sources. It should be understood that power sources 40, 42 may be any power source capable of providing braking power to the EMAs, and this power may be provided by various aircraft systems and/or subsystems.

In an embodiment where EMACs are not employed, the power sources 40, 42 provide power to the EMAs 26 via the power busses 41, 43. The conductors in the power bus may be grouped together and/or carried over fewer and/or larger conductors up to a location proximate certain EMAs, for example, near the top of a landing gear strut. Then the conductors may branch off to carry the power to the individual EMAs. In this manner, as will be described further below, the current drawn may be measured at the power bus at a single location in order to infer a braking condition of a plurality of EMAs.

In a braking operation, whether normal, emergency and/or park braking is being applied, a current flowing in the power busses 41, 43 is drawn in order to drive the EMAs 26 and the rams 30. This drawn current and/or power consumed by the EMAs 26 is proportional to the actual amount of braking force applied by the EMAs 26 that are being driven by the power source 40. Measuring this drawn current and/or consumed power may indicate to an operator of the aircraft that a certain amount of braking force is being applied to the brake stacks 32 and the wheels 34. For example, if no current was being drawn, the operator would know that there was likely no braking force being applied. Various embodiments disclosed herein provide ways for the operator to have an indication that braking force is being applied by measuring the amount of current drawn during an emergency and/or park braking operation. Further, measuring current may also allow the operator to crosscheck braking force being applied during a normal braking operation.

In an embodiment, sensors 50 may be utilized to measure the amount of current drawn during a braking operation. For example, the sensor 50 may be located on the power bus 41 between the power source 40 and the EMAC 24. Measuring the drawn current at a single location, as opposed to measuring current associated with each individual EMA 26, reduces the number of wires that run to the EMAs 26, which saves cost and weight. In an embodiment where an EMAC is not present, the sensor 50 may be located at a single location prior to the individual wires for a plurality of EMAs branching off to the EMAs (see, e.g., FIG. 3).

Figure 2:
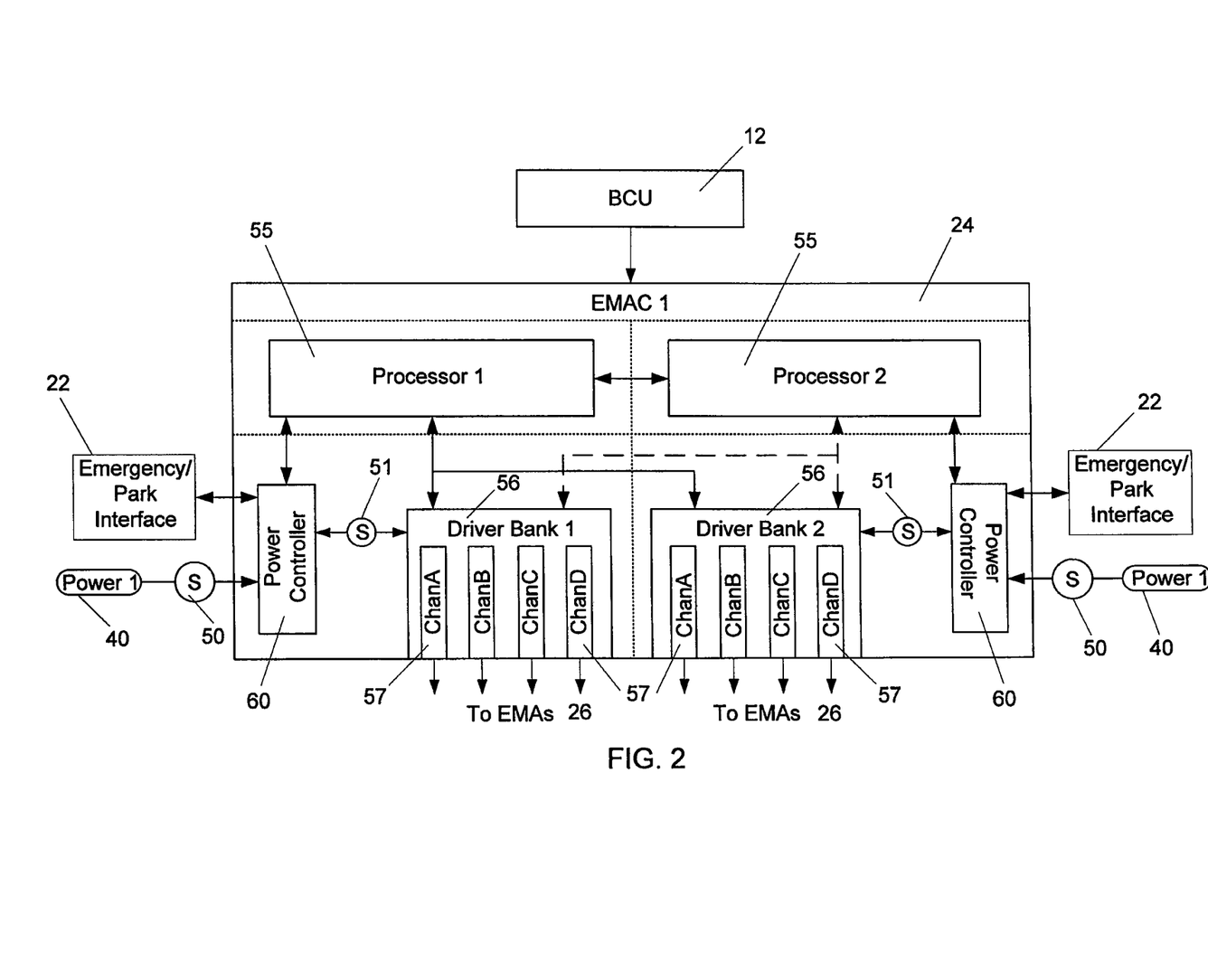
FIG. 2 illustrates a schematic representation of an electromechanical actuator controller according to an embodiment.

Turning now to FIG. 2, the EMAC 24, in accordance with various embodiments, comprises processors 55 that receive braking commands from the BCU 12 during normal braking operations. The processors 55 utilize the braking commands to instruct drivers 57 to drive the EMAs 26 in accordance with an operator input, for example, from a pedal or autobrake switch. The processors 55 include microcontrollers to facilitate controlling normal braking operation, and multiple processors 55 may be used for redundancy. The drivers are contained within a driver bank 56, and each driver 57 is associated with an EMA 26 to control actuation of the EMA 26.

The processors 55 are also coupled to power controllers 60. The power controllers 60 control which of the normal braking signal or the emergency/park braking signal is delivered to the driver banks 56 for actuation of the EMAs 26. If the power controllers 60 indicate that a normal braking signal is to be applied, the driver banks 56 and the drivers 57 are controlled by processors 55.

On the other hand, if the emergency/park interface 22 indicates to the power controllers 60 that an emergency/park braking signal should be applied, in one embodiment, the power controllers 60 bypass the processors 55 and deliver the emergency/park braking command to the driver banks 56. Thus, the emergency/park braking signal bypasses both the BCU 12 and the processors 55. Eliminating the processors 55 from the circuit path of the emergency/park braking signal simplifies the circuitry involved. For example, the power controllers 60 may include a simple switch that closes or opens when the emergency/park braking signal is indicated, in order to bypass the processors 55. Furthermore, because microprocessors are not involved in the circuit path during emergency/park braking, less development assurance is utilized.

In various embodiments where EMACs 24 are not present (e.g., the distributed case), the EMAs 26 may individually include a driver 57 for effectuating braking by the EMAs 26. In an embodiment, the drivers 57 may be located together in a group of drivers near the EMAs that are driven by the drivers 57. Furthermore the processors 55 and/or power controllers 60 may be located in each EMA 26, and/or the processors 55, drivers 57, and/or power controllers 60 may be located near a group of EMAs 26 (e.g., near the top of a landing gear strut) to facilitate controlling and driving a group of EMAs 26. The descriptions of drivers, processors, and power controllers herein should thus be understood to be applicable to the distributed case where the drivers 57, processors 55, and/or power controllers 60 are located in and/or proximate the EMAs 26, instead of in the EMACs 24. For example, during an emergency/park braking operation, the emergency/park braking signal may bypass the BCU 12 and the processors 55 (wherever they are located) and drive the drivers 57 to effectuate braking of the vehicle.

As discussed previously, the sensor 50 may be utilized to measure current during normal and/or emergency/park braking operations. A measured amount of current drawn and/or power consumed may provide an indication to the vehicle operator that a certain amount of braking force is being applied. Although two sensors 50 are illustrated in FIG. 2, it should be understood that, as illustrated in FIG. 1, one sensor 50 may be used to measure the current on the power buses 41, 43 as the power buses 41, 43 provide power to the EMACs 24. However, in various embodiments, more than one sensor 50 may be used. For example, as illustrated in FIG. 2, the sensors 51 may be used in addition to and/or instead of the sensors 50. The sensors 51 may be disposed between the power controllers 60 and the driver banks 56 (and/or between groups of the individual drivers in the distributed case) in order to measure the current at a single location for each individual driver bank 56 (or group of drivers 57). Measuring the current along existing wiring reduces the need to run additional wiring to each of the drivers 57 and/or EMAs 26 in order to sense the current.

During a normal braking operation, the processors 55 may be able to determine the amount of braking force being applied by each of the EMAs 26 because the processors 55 are communicatively coupled to each of the EMAs 26 via the drivers 57. This coupling allows the processors 55 to determine the braking force being applied. However, because the sensor 50 may also sense a current drawn during normal braking operations, the sensor 50 may be utilized to crosscheck the braking force determined by the processors 55 to assess whether or not a normal braking force is actually being applied.

Figure 3:
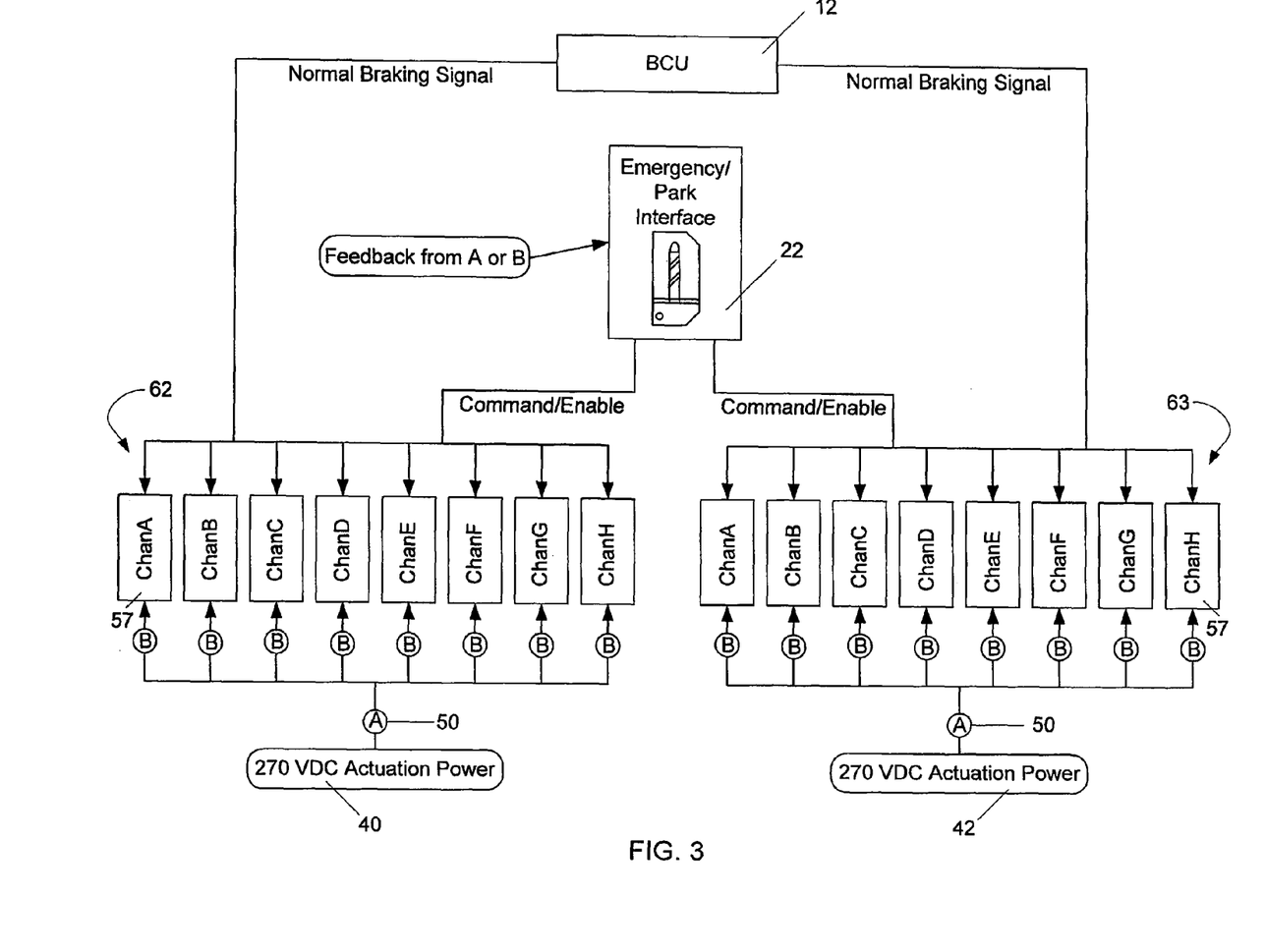
FIG. 3 illustrates a schematic representation of an emergency/park braking system with sensor measurement points according to an embodiment.

FIG. 3 illustrates a schematic representation of an emergency/park braking component according to an embodiment. In various embodiments, FIG. 3 illustrates both a case where an EMAC is present (e.g., drivers 57 are located with an EMAC) and where an EMAC is not present (e.g., drivers 57 are individually located in the EMAs or near the EMAs). Emergency/park interface 22 provides a command/enable signal to the drivers 57. The power sources 40, 42 provide 270 VDC actuation power to the drivers 57. The command/enable signal and the actuation power allows the drivers to cause the EMAs to effectuate braking of the vehicle. As noted previously, the drawn current, measured at a point between the power sources 40, 42 and the drivers 57, is proportional to the actual braking force being applied by the EMAs.

The sensor 50 may be used to sense a drawn current at a single location "A" between the power source 40 and a first set 62 and/or a second set 63 of the drivers 57. In an embodiment, one sensor may be used for the first set 62 and another sensor may be used for the second set 63 of the drivers 57.

As illustrated, in an embodiment, each set 62, 63 of the drivers 57 may include eight drivers 57 that drive eight EMAs. The current could be measured at each location "B" in order to individually determine the current drawn and/or power consumed by each EMA. However, measuring the current at each individual driver 57 would require more wiring and circuitry than measuring the current at the single location "A" with the sensors 50 for each set 62, 63 of the drivers 57. Thus, utilizing the sensor 50 reduces the cost and weight associated with verifying that a braking force is being applied by the EMAs during an emergency/park braking operation. As noted above, the sensor 50 may also be utilized to crosscheck the braking force being applied during normal braking. For example, the signal from the sensor 50 may be fed through the normal braking command interface (e.g., BCU 12) to facilitate crosschecking the braking force exerted by the EMAs.

Figure 4:
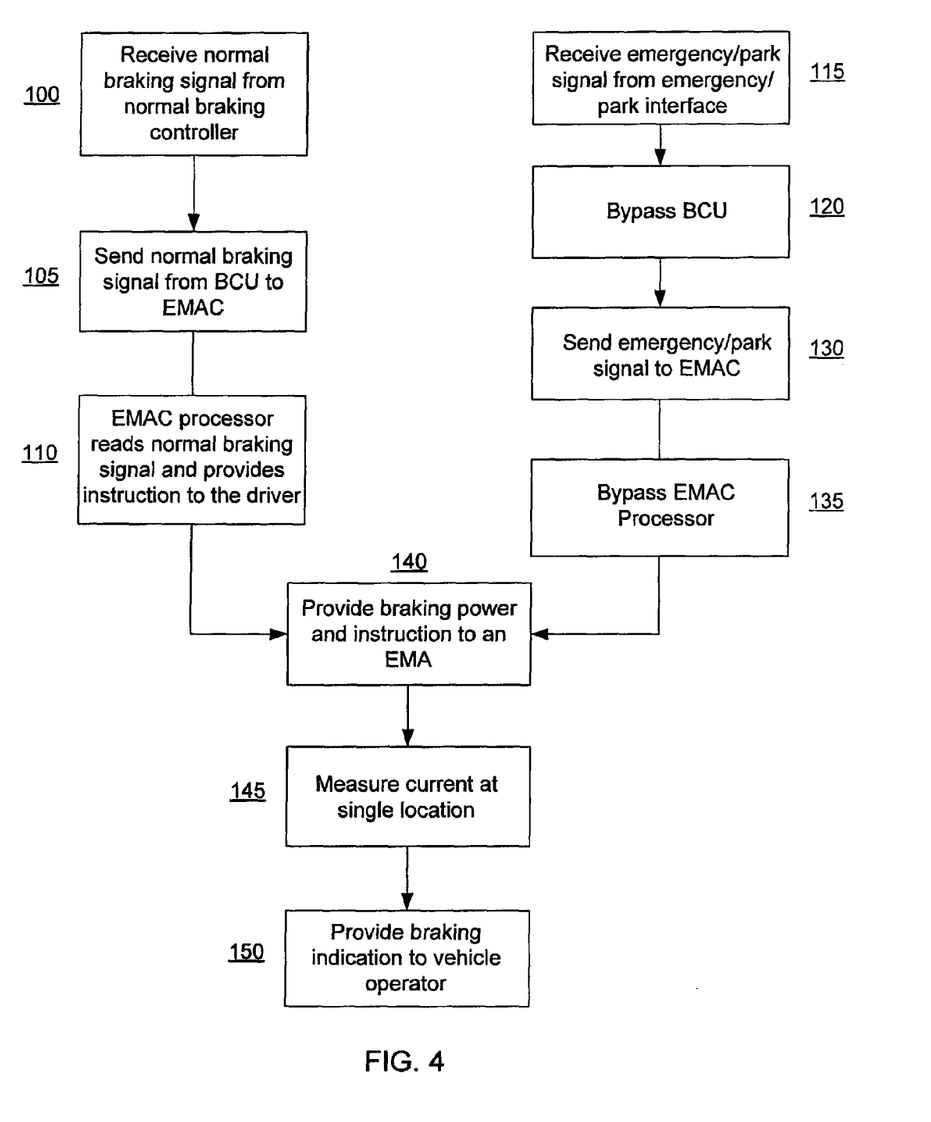
FIG. 4 illustrates a flow chart representing an electrical braking method according to an embodiment.

Turning now to FIG. 4, a method for providing an indication of electrical braking is disclosed. During normal braking, at step 100, the BCU receives a normal braking command from an operator of a vehicle, a brake input device, an antiskid controller and/or the like. The BCU then sends the normal braking signal to the EMAC at step 105. At step 110, The EMAC processor reads the normal braking signal and provides a braking instruction to the EMA driver. The EMAC, at step 140, provides a braking instruction and braking power from the power controller to the EMA. Then the current is measured at a single location, as discussed above (step 145), and the braking system provides a braking indication to the operator of the vehicle (step 150) that may be crosschecked with an indication of normal braking received through the normal braking system.

Where emergency/park braking is indicated, an emergency/park braking signal is received from the emergency/park controller at step 115. At step 120, the emergency/park braking signal bypasses the BCU and is sent to the EMAC at step 130. Within the EMAC, the emergency/park braking signal bypasses the EMAC processor (step 135) and provides an emergency/park braking instruction and power to the EMA through the EMAC driver (step 140). Then, at step 145, the current is measured at a single location, instead of at multiple locations associated with each driver. At step 150, the braking system provides an emergency/park braking indication to the operator of the vehicle so that the operator may determine that a braking force is being applied. This indication is provided to the operator with reduced circuitry and wiring because the current is measured at a single location for each EMAC, or for more than one EMAC (e.g., a single location for each of two EMACs).

In an embodiment where EMACs are not employed, during normal braking, the BCU receives a normal braking command from an operator of a vehicle, a brake input device, an anti-skid controller and/or the like. The BCU then sends the normal braking signal to the various EMAs. The processors in the EMAs (or processors controlling groups of EMAs) read the normal braking signal and provide a braking instruction to the EMA drivers in the individual EMAs (or near the EMAs). A braking power from the power controller is provided to the EMAs. Then the current is measured at a single location, for example, at a conductor (or group of conductors joined together) common to a group of EMAs, and the braking system provides a braking indication to the operator of the vehicle that may be crosschecked with an indication of normal braking received through the normal braking system.

Where emergency/park braking is indicated, an emergency/park braking signal is received from the emergency/park controller. Then the emergency/park braking signal bypasses the BCU and is sent to the individual EMAs, bypassing the processor(s) associated with the EMAs. Power is then provided to the individual EMAs to effectuate braking of the vehicle. The current is measured at a single location common to a group of drivers, instead of at multiple locations associated with each driver. The braking system then provides an emergency/park braking indication to the operator of the vehicle so that the operator may determine that a braking force is being applied. This indication is provided to the operator with reduced circuitry and wiring because the current is measured at a single location for a group of EMAs.

Although the disclosure has been shown and described with respect to certain embodiments, equivalents and modifications will occur to others who are skilled in the art upon reading and understanding of the specification. Various embodiments include all such equivalents and modifications, and are limited only by the scope of the following claims.

Additionally, benefits, other advantages, and solutions to problems have been described herein with regard to various embodiments. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, and C" or "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A system for electrical braking of a vehicle, comprising:
a power bus coupled to a first driver associated with a first electromechanical actuator (EMA), wherein the power bus is coupled to a second driver associated with a second EMA, wherein the first EMA and the second EMA are associated with a wheel of the vehicle, and wherein the power bus provides braking power to the first EMA via the first driver and to the second EMA via the second driver;
a normal braking command interface for providing a first braking signal to the first driver and a second braking signal to the second driver;
an emergency/park brake interface for sending a first emergency/park braking signal to the first driver and a second emergency/park braking signal to the second driver, wherein the first emergency/park braking signal and the second emergency/park braking signal bypass the normal braking command interface;
a driver bank comprising the first driver and the second driver, wherein the driver bank is in electrical communication with a power controller via a driver bank supply power bus;
a sensor coupled to the driver bank supply power bus for measuring a current drawn by the driver bank, wherein the current is proportional to a braking force exerted by the first EMA and the second EMA on the wheel;
wherein the power controller is coupled to the power bus for providing power to the first driver and the second driver in response to at least one of the first braking signal, the second braking signal, the first emergency/park braking signal, or the second emergency/park braking signal; and
a second sensor disposed between a power source and the power controller, wherein the second sensor measures a current supplied to the power controller.

2. The system of claim 1, wherein the current measured by the sensor indicates that the first EMA and the second EMA are exerting the braking force on the wheel.

3. The system of claim 1, wherein the normal braking command interface comprises a brake control unit (BCU), and wherein the first braking signal and the second braking signal include a normal braking signal from a normal braking signal interface of the vehicle.

4. The system of claim 3, wherein the current measured by the sensor indicates that the braking force complies with the normal braking signal.

5. The system of claim 1, wherein the current measured by the sensor relates to at least one of a drawn current and a consumed power, and wherein the current indicates that the braking force complies with the first emergency/park braking signal and the second emergency/park braking signal.

6. The system of claim 1, wherein the first driver is disposed in the first EMA, and wherein the second driver is disposed in the second EMA.

7. The system of claim 3, further comprising an electromechanical actuator controller (EMAC), wherein the driver bank, the first driver and the second driver are disposed in the EMAC.

8. The system of claim 7, wherein the EMAC is coupled to the BCU for receiving the first braking signal and the second braking signal from the BCU, wherein the EMAC comprises a processor coupled to the first driver and the second driver for instructing the first EMA and the second EMA to exert the braking force on the wheel.

9. The system of claim 8, wherein the first emergency/park braking signal and the second emergency/park braking signal bypass the processor.

10. The system of claim 7, wherein the EMAC comprises a plurality of EMA drivers for providing a plurality of driving signals to a plurality of EMAs, wherein the sensor measures the current at the single location for estimating the braking force exerted by the plurality of EMAs.

11. The system of claim 3, wherein the normal braking signal interface and the emergency/park brake interface individually comprise at least one of a handle, a lever, a pedal, a button, a dial, a switch, a digital display, or a touch screen.

* * * * *